US010232346B2

(12) United States Patent
Boualleg et al.

(10) Patent No.: US 10,232,346 B2
(45) Date of Patent: Mar. 19, 2019

(54) METHODS FOR THE PREPARATION OF ALUMINA BEADS FORMED BY DEWATERING A HIGHLY DISPERSIBLE GEL

(71) Applicant: IFP Energies nouvelles, Rueil-Malmaison (FR)

(72) Inventors: Malika Boualleg, Villeurbanne (FR); Aurelie Dandeu, Saint-Just Chaleyssin (FR)

(73) Assignee: IFP Energies nouvelles, Rueil-Malmaison (FR)

(*) Notice: Subject to any disclaimer, the term of this patent is extended or adjusted under 35 U.S.C. 154(b) by 0 days.

(21) Appl. No.: 15/537,794

(22) PCT Filed: Dec. 16, 2015

(86) PCT No.: PCT/EP2015/079992
§ 371 (c)(1),
(2) Date: Jun. 19, 2017

(87) PCT Pub. No.: WO2016/096985
PCT Pub. Date: Jun. 23, 2016

(65) Prior Publication Data
US 2018/0021754 A1 Jan. 25, 2018

(30) Foreign Application Priority Data
Dec. 18, 2014 (FR) ...................... 14 62833

(51) Int. Cl.
*B01J 21/04* (2006.01)
*B01J 37/08* (2006.01)
*C01F 7/44* (2006.01)
*C10G 35/06* (2006.01)
*C01F 7/14* (2006.01)
*C01F 7/34* (2006.01)
*C10G 35/085* (2006.01)
*B01J 37/03* (2006.01)
*B01J 20/08* (2006.01)
*B01J 23/40* (2006.01)
*B01J 27/135* (2006.01)
*B01J 35/00* (2006.01)
(Continued)

(52) U.S. Cl.
CPC ............... *B01J 21/04* (2013.01); *B01J 20/08* (2013.01); *B01J 20/28016* (2013.01); *B01J 20/28057* (2013.01); *B01J 20/28069* (2013.01); *B01J 20/28078* (2013.01); *B01J 23/38* (2013.01); *B01J 23/40* (2013.01); *B01J 27/135* (2013.01); *B01J 35/002* (2013.01); *B01J 35/0006* (2013.01); *B01J 35/0013* (2013.01); *B01J 35/026* (2013.01); *B01J 35/1019* (2013.01); *B01J 37/009* (2013.01); *B01J 37/0018* (2013.01); *B01J 37/0072* (2013.01); *B01J 37/031* (2013.01); *B01J 37/08* (2013.01); *C01F 7/141* (2013.01); *C01F 7/34* (2013.01); *C01F 7/44* (2013.01); *C01F 7/441* (2013.01); *C10G 35/06* (2013.01); *C10G 35/085* (2013.01); *B01J 35/08* (2013.01); *B01J 35/1042* (2013.01); *B01J 35/1061* (2013.01); *C01P 2002/02* (2013.01); *C01P 2004/32* (2013.01); *C01P 2006/12* (2013.01); *C01P 2006/14* (2013.01); *C01P 2006/17* (2013.01); *C01P 2006/22* (2013.01); *C01P 2006/80* (2013.01); *C10G 2400/02* (2013.01)

(58) Field of Classification Search
CPC .... B01L 21/04; B01L 35/1019; B01L 37/031; B01L 37/08; B01L 37/009; B01L 37/0018; B01L 37/0072; C01F 7/141; C01F 7/44; C10G 35/06
See application file for complete search history.

(56) References Cited

U.S. PATENT DOCUMENTS

| 2,890,162 A | * | 6/1959 | Anderson, Jr. | .......... B01J 21/16 208/112 |
| 2,995,510 A | * | 8/1961 | Bertolacini | ............. B01J 21/04 208/139 |

(Continued)

FOREIGN PATENT DOCUMENTS

| CN | 101993102 A | 8/2007 |
| GB | 967902 A | 8/1964 |

OTHER PUBLICATIONS

International Search report for PCT/EP2015/079992 dated Feb. 24, 2016.

(Continued)

*Primary Examiner* — Randy Boyer
(74) *Attorney, Agent, or Firm* — Millen, White, Zelano and Branigan, P.C.

(57) ABSTRACT

A process for the preparation of an alumina in the form of beads with a sulphur content in the range 0.001% to 1% by weight and a sodium content in the range 0.001% to 1% by weight with respect to the total mass of said beads is described, said beads being prepared by shaping an alumina gel having a high dispersibility by drop coagulation. The alumina gel is itself prepared using a specific precipitation preparation process in order to obtain at least 40% by weight of alumina with respect to the total quantity of alumina formed at the end of the gel preparation process right from the first precipitation step, the quantity of alumina formed at the end of the first precipitation step possibly even reaching 100%. The invention also concerns the use of alumina beads as a catalyst support in a catalytic reforming process.

13 Claims, No Drawings

(51) Int. Cl.
*B01J 35/10* (2006.01)
*B01J 37/00* (2006.01)
*B01J 20/28* (2006.01)
*B01J 23/38* (2006.01)
*B01J 35/02* (2006.01)
B01J 35/08 (2006.01)

(56) References Cited

U.S. PATENT DOCUMENTS

| | | | | |
|---|---|---|---|---|
| 3,238,272 A | * | 3/1966 | Nixon | C07C 5/2713 |
| | | | | 502/217 |
| 3,720,728 A | * | 3/1973 | Pollitzer | C10G 45/60 |
| | | | | 208/DIG. 2 |
| 4,019,978 A | * | 4/1977 | Miller | B01J 21/04 |
| | | | | 208/213 |
| 4,727,209 A | | 2/1988 | Chao | |
| 6,713,428 B1 | | 3/2004 | Le Goff | |
| 7,790,652 B2 | | 9/2010 | Ackerman | |
| 8,894,842 B2 | * | 11/2014 | Lacombe | B01J 21/04 |
| | | | | 208/134 |
| 2014/0357471 A1 | * | 12/2014 | Lacombe | C04B 35/111 |
| | | | | 502/8 |

OTHER PUBLICATIONS

English machine translation of CN101993102A published Mar. 30, 2011 to Zhang Yi of Inst Process Eng Cas.

* cited by examiner

METHODS FOR THE PREPARATION OF ALUMINA BEADS FORMED BY DEWATERING A HIGHLY DISPERSIBLE GEL

TECHNICAL FIELD

The present invention relates to the preparation of an amorphous mesoporous alumina shaped into beads by drop coagulation, starting from an alumina gel with a high dispersibility, said alumina gel being obtained by precipitation of at least one aluminium salt. In particular, the present invention relates to a process for the preparation of said alumina by shaping an alumina gel, said alumina gel being prepared in accordance with a specific process for preparation by precipitation, in order to obtain at least 40% by weight of alumina with respect to the total quantity of alumina formed at the end of the gel preparation process, starting from the first precipitation step, the quantity of alumina formed at the end of the first precipitation step possibly even reaching 100%.

The alumina beads obtained thereby may be used as a support for catalysts in many refining processes, and in particular refining processes being operated in ebullated bed mode. Preferably, the alumina beads obtained in accordance with the invention may be used as a catalyst support in oligomerization or catalytic reforming processes. The alumina beads obtained thereby may also be used as an adsorbent.

PRIOR ART

U.S. Pat. No. 7,790,652 describes a novel alumina support having a highly specific pore distribution which may be used as a catalyst support in a process for the hydroconversion of heavy hydrocarbon feeds. Said support comprising alumina has a mean pore diameter in the range 100 to 140 Å, a size distribution wherein the width is less than 33 Å, and a pore volume of at least 0.75 mL/g in which less than 5% of the pore volume of said support is present in pores with a diameter of more than 210 Å.

Said support used in combination with an active hydrogenating phase can be used to obtain unexpected catalytic performances in the case in which it is used in the hydroconversion of heavy feeds preferably have a majority of its components boiling at a temperature of more than 343° C. In particular, the process for the hydroconversion of heavy feeds in accordance with U.S. Pat. No. 7,790,652 can be used to obtain a conversion of hydrocarbon compounds boiling at a temperature of more than 524° C. which is substantially improved compared with the conversions obtained with conventional prior art catalysts.

Said alumina support is prepared using a method comprising a first step for the formation of an alumina dispersion by mixing, in a controlled manner, a first alkaline aqueous solution and a first acidic aqueous solution, at least one of said acid and basic solutions or both comprising an alumina compound. The acidic and basic solutions are mixed in proportions such that the pH of the resulting dispersion is in the range 8 to 11. The acidic and basic solutions are also mixed in quantities which can be used to obtain a dispersion containing the desired quantity of alumina; in particular, the first step can be used to obtain 25% to 35% by weight of alumina with respect to the total quantity of alumina formed at the end of the two precipitation steps. The first step is operated at a temperature in the range 20° C. to 40° C. When the desired quantity of alumina has been formed, the temperature of the suspension is increased to a temperature in the range 45° C. to 70° C., then the heated suspension undergoes a second precipitation step by bringing said suspension into contact with a second alkaline aqueous solution and a second acidic aqueous solution, at least one of the two solutions or both thereof comprising an alumina compound. Similarly, the pH is adjusted to between 8 and 10.5 by means of the added proportions of acidic and basic solutions and the remaining quantity of the alumina to be formed in the second step is supplied by the added quantities of the two solutions, acidic and basic. The second step is operated at a temperature in the range 20° C. to 40° C. The alumina gel which is thus formed comprises at least 95% boehmite. The dispersibility of the alumina gel obtained thereby is not mentioned. The alumina gel is then filtered, washed and optionally dried using methods which are known to the skilled person without a prior heat treatment step, in order to produce an alumina powder which is then shaped using methods which are known to the skilled person, then calcined to produce the final alumina support.

The first precipitation step in the preparation process of U.S. Pat. No. 7,790,652 is limited to the production of a small quantity of alumina, in the range 25% to 35% by weight, because producing more alumina at the end of the first step does not allow for optimized filtration of the gel obtained. Furthermore, increasing the production of alumina in the first step of U.S. Pat. No. 7,790,652 would not allow the gel obtained thereby to be shaped.

Surprisingly, the Applicant has discovered that a specific alumina gel with a degree of dispersibility which is high, prepared in accordance with a process comprising at least one precipitation step in which at least 40% by weight of alumina, in equivalents of $Al_2O_3$ with respect to the total quantity of alumina formed at the end of said gel preparation process, formed from the first precipitation step, and a step for final heat treatment and in particular a final maturation step, can be shaped by drop coagulation in order to obtain amorphous mesoporous alumina beads with a high BET specific surface area.

In particular, the preparation process of the invention can be used to obtain alumina beads with a high BET specific surface area compared with alumina beads obtained in accordance with conventional prior art processes.

SUMMARY AND ADVANTAGE OF THE INVENTION

The present invention provides a process for the preparation of an alumina in the form of beads with a sulphur content in the range 0.001% to 1% by weight and a sodium content in the range 0.001% to 1% by weight with respect to the total mass of said beads, said process comprising at least the following steps:

a) at least one first step for the precipitation of alumina, in an aqueous reaction medium, using at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected in a manner such as to obtain a pH of the reaction medium in the range 8.5 to 10.5 and the flow rate of the acidic and basic precursor or precursors containing aluminium being regulated in a manner such as to obtain a percentage completion of said first step in the range 40% to 100%, the percentage completion being defined as being the proportion of alumina formed in equivalents of $Al_2O_3$ during said first precipitation step with respect to the total quantity of alumina formed at the end of the precipitation step or steps, said first precipitation step being operated at a temperature in the range 10° C. to 50° C., and for a period in the range 2 minutes to 30 minutes;

b) a step for heat treatment of the suspension obtained at the end of step a) at a temperature in the range 50° C. to 200° C. for a period in the range 30 minutes to 5 hours in order to obtain an alumina gel;

c) a step for filtration of the suspension obtained at the end of the heat treatment step b) followed by at least one step for washing the gel obtained;

d) a step for drying the alumina gel obtained at the end of step c) in order to obtain a powder;

e) a step for shaping the powder obtained at the end of step d) by drop coagulation in order to obtain the green material;

f) a step for heat treatment of the green material obtained at the end of step e) at a temperature in the range 500° C. to 1000° C., in the presence or absence of a stream of air containing up to 60% by volume of water.

One advantage of the invention is the provision of a novel process for the preparation of an amorphous mesoporous alumina in the form of beads, in order to enable an alumina gel prepared using a process comprising at least one step for precipitation in which at least 40% by weight of alumina in equivalents of $Al_2O_3$ with respect to the total quantity of alumina formed at the end of said gel preparation process is formed from the first precipitation step to be shaped by drop coagulation, because a heat treatment step and in particular a maturation step is carried out in order to obtain an alumina gel with an improved filterability, with improved shaping.

Another advantage of the invention is the provision of a novel process for the preparation of an alumina by precipitation which may comprise a single precipitation step, which is cheaper than the conventional prior art alumina preparation processes such as, for example, sol-gel type preparation processes.

Another advantage of the invention is the provision of a novel process for the preparation of alumina in the form of beads which is less expensive than conventional processes for the preparation of alumina beads such as, for example, processes for the preparation of alumina beads by an alkoxide pathway.

Another advantage of the invention is the provision of a novel process for the preparation of alumina in the form of beads which can be used to obtain amorphous mesoporous alumina beads with a high BET specific surface area compared with prior art aluminas.

Definitions and Measurement Methods

Throughout the remainder of the text, the dispersibility index is defined as the percentage by weight of peptised alumina gel which can be dispersed by centrifuging in a polypropylene tube at 3600 G for 10 min.

The dispersibility is measured by dispersing 10% of boehmite or alumina gel in a suspension of water also containing 10% of nitric acid with respect to the mass of boehmite. Next, the suspension is centrifuged at 3600 G rpm for 10 min. The collected sediments are dried overnight at 100° C. then weighed.

The dispersibility index, denoted DI, is obtained by carrying out the following calculation: DI (%)=100%−mass of dried sediments (%).

The alumina of the present invention also has a specific pore distribution in which the macropore and mesopore volumes are measured by mercury intrusion and the micropore volume is measured by nitrogen adsorption.

The term "macropores" is used to mean pores with an opening of more than 50 nm.

The term "mesopores" is used to mean pores with an opening in the range 2 nm to 50 nm, limits included.

The term "micropores" is used to mean pores with an opening strictly less than 2 nm.

In the following description of the invention, the pore distribution measured by mercury porosimetry is determined by mercury intrusion porosimetry using the ASTM standard D4284-83 at a maximum pressure of 4000 bar (400 MPa), using a surface tension of 484 dyne/cm and a contact angle of 140°. The wetting angle is taken to be 140° in accordance with the recommendations in the standard work "Techniques de L'ingénieur, traité analyse et caractérisation" [Engineering Techniques, Analysis and Characterization], pp 1050-5, authors Jean Charpin and Bernard Rasneur.

The value above which the mercury fills all of the intergranular voids is set at 0.2 MPa and it is considered that beyond this, the mercury penetrates into the alumina pores. In order to obtain better precision, the value for the total pore volume corresponds to the value for the total pore volume measured by mercury intrusion porosimetry measured for the sample minus the value for the total pore volume measured by mercury intrusion porosimetry measured for the same sample for a pressure corresponding to 30 psi (approximately 0.2 MPa).

The macropore volume of the catalyst is defined as being the cumulative volume of mercury introduced at a pressure in the range 0.2 MPa to 30 MPa, corresponding to the volume contained in pores with an apparent diameter of more than 50 nm.

The mesopore volume of the catalyst is defined as being the cumulative volume of mercury introduced at a pressure in the range 30 MPa to 400 MPa, corresponding to the volume contained in pores with an apparent diameter in the range 2 to 50 nm.

The micropore volume is measured by nitrogen porosimetry. Quantitative analysis of the microporosity is carried out using the "t" method (Lippens-De Boer, 1965), which corresponds to a transform of the starting adsorption isotherm as described in the study "Adsorption by powders and porous solids. Principles, methodology and applications" by F. Rouquérol, J. Rouquérol and K. Sing, Academic Press, 1999.

The median diameter of the mesopores (Dp, in nm) is also defined as being a diameter at which all of the pores with a dimension below this diameter constitute 50% of the mesopore volume, measured by mercury porosimetry.

The pore distribution, measured by nitrogen adsorption, was determined by the Barrett-Joyner-Halenda (BJH) model. The nitrogen adsorption-desorption isotherm in accordance with the BJH model is described in the periodical "The Journal of American Chemical Society", 73, 373, (1951) by E. P. Barrett, L. G. Joyner and P. P. Halenda. In the description of the invention below, the term "nitrogen adsorption volume" is intended to mean the volume measured for P/P0=0.99, the pressure at which it is assumed that the nitrogen has filled all of the pores.

In the description of the invention below, the term "specific surface area" is used to mean the BET specific surface area determined by nitrogen adsorption in accordance with the ASTM standard D 3663-78 established from the BRUNAUER-EMMETT-TELLER method described in the periodical "The Journal of American Chemical Society", 60, 309, (1938).

The value for GCS is obtained using a standard test (ASTM standard D4179-01), which consists of subjecting a material in the form of a millimetric object, such as a bead in the case of the present invention, to a compressive force generating rupture. Thus, this test is a measure of the tensile strength of the material. The analysis is repeated for a certain number of solids individually, typically for a number of solid bodies in the range 10 to 200. The mean of the measured lateral rupture forces constitutes the mean GCS which in the case of spheroidal particles is expressed as a force unit (N).

DESCRIPTION OF THE INVENTION

In accordance with the invention, the process for the preparation of an alumina in the form of beads comprises at least the following steps:

a) at least one first step for the precipitation of alumina, in an aqueous reaction medium, using at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected in a manner such as to obtain a pH of the reaction medium in the range 8.5 to 10.5 and the flow rate of the acidic and basic precursor or precursors containing aluminium being regulated in a manner such as to obtain a percentage completion of said first step in the range 40% to 100%, the percentage completion being defined as being the proportion of alumina formed in equivalents of $Al_2O_3$ during said first precipitation step with respect to the total quantity of alumina formed at the end of the precipitation step or steps, said first precipitation step being operated at a temperature in the range 10° C. to 50° C., and for a period in the range 2 minutes to 30 minutes;

b) a step for heat treatment of the suspension obtained at the end of step a) at a temperature in the range 50° C. to 200° C. for a period in the range 30 minutes to 5 hours in order to obtain an alumina gel;

c) a step for filtration of the suspension obtained at the end of the heat treatment step b) followed by at least one step for washing the gel obtained;

d) a step for drying the alumina gel obtained at the end of step c) in order to obtain a powder;

e) a step for shaping the powder obtained at the end of step d) by drop coagulation in order to obtain the green material;

f) a step for heat treatment of the green material obtained at the end of step e) at a temperature in the range 500° C. to 1000° C., in the presence or absence of a stream of air containing up to 60% by volume of water.

In general, the term "percentage completion" of the $n^{th}$ precipitation step means the percentage of alumina formed, in equivalents of $Al_2O_3$, in said $n^{th}$ step, with respect to the total quantity of alumina formed at the end of this series of precipitation steps and more generally at the end of the alumina gel preparation steps.

In the case in which the percentage completion of said precipitation step a) is 100%, said precipitation step a) can generally be used to obtain a suspension of alumina with a concentration of $Al_2O_3$ in the range 20 to 100 g/L, preferably in the range 20 to 80 g/L, preferably in the range 20 to 50 g/L.

Precipitation Step a)

Mixing at least one basic precursor and at least one acidic precursor in the aqueous reaction medium necessitates either that at least the basic precursor or the acidic precursor should comprise aluminium, or that both the basic and acidic precursors should comprise aluminium.

The basic precursors comprising aluminium are sodium aluminate and potassium aluminate. The preferred basic precursor is sodium aluminate.

The acidic precursors comprising aluminium are aluminium sulphate, aluminium chloride and aluminium nitrate. The preferred acidic precursor is aluminium sulphate.

Preferably, the basic and acidic precursor(s) are added to said first precipitation step a) in aqueous solution containing said precursor or precursors.

Preferably, the basic and acidic precursor(s) are added to said first precipitation step a) in aqueous solution.

Preferably, the aqueous reaction medium is water.

Preferably, said step a) is operated with stirring.

Preferably, said step a) is carried out in the absence of an organic additive.

The acidic and basic precursors, whether or not they contain aluminium, are mixed, preferably in solution, in the aqueous reaction medium in proportions such that the pH of the resulting suspension is in the range 8.5 to 10.5.

In accordance with the invention, it is the relative flow rate of the acidic and basic precursors, whether or not they contain aluminium, which is selected in a manner such as to obtain a pH of the reaction medium in the range 8.5 to 10.5.

In the preferred case in which the basic and acidic precursors are respectively sodium aluminate and aluminium sulphate, the weight ratio of said basic precursor to said acidic precursor is advantageously in the range 1.6 to 2.05.

For the other basic and acidic precursors, whether or not they contain aluminium, the base/acid weight ratios are established by a plot for the neutralization of the base by the acid. A plot of this type can readily be obtained by the skilled person.

Preferably, said precipitation step a) is carried out at a pH in the range 8.5 to 10, highly preferably in the range 8.7 to 9.9.

The acidic and basic precursors are also mixed in quantities allowing the production of a suspension containing the desired quantity of alumina, which is a function of the final concentration of alumina to be obtained. In particular, said step a) can be used to obtain 40% to 100% by weight of alumina in equivalents of $Al_2O_3$ with respect to the total quantity of alumina formed at the end of the precipitation step or steps and more generally at the end of the alumina gel preparation steps.

In accordance with the invention, it is the flow rate of the acidic and basic precursor or precursors containing aluminium which is regulated in order to obtain a percentage completion for the first step in the range 40% to 100%.

Preferably, the percentage completion of said precipitation step a) is in the range 40% to 99%, preferably in the range 45% to 90% and more preferably in the range 50% to 85%.

In the case in which the percentage completion obtained at the end of the precipitation step a) is less than 100%, a second precipitation step is necessary in order to increase the quantity of alumina formed. In this case, the percentage completion is defined as being the proportion of alumina formed in equivalents of $Al_2O_3$ during said precipitation step a) with respect to the total quantity of alumina formed at the end of the two precipitation steps of the preparation process of the invention and more generally at the end of the alumina gel preparation steps.

Thus, depending on the target concentration of alumina at the end of the precipitation step or steps, preferably in the range 20 to 100 g/L, the quantities of aluminium which have to be added by the acidic and/or basic precursors are calculated and the flow rate of the precursors is regulated as a function of the concentration of said aluminium precursors which are added, of the quantity of water added to the reaction medium and of the percentage completion required for the precipitation step or steps.

The flow rates of the acidic and/or basic precursors containing aluminium depend on the dimensions of the reactor used and thus on the quantity of water added to the reaction medium.

Preferably, said precipitation step a) is carried out at a temperature in the range 10° C. to 45° C., preferably in the range 15° C. to 45° C., more preferably in the range 20° C. to 45° C. and highly preferably in the range 20° C. to 40° C.

It is important that said precipitation step a) is operated at low temperature. In the case in which said preparation process of the invention comprises two precipitation steps, precipitation step a) is advantageously carried out at a temperature below the temperature of the second precipitation step.

Preferably, said precipitation step a) is carried out for a period in the range 5 to 20 minutes, preferably 5 to 15 minutes.

Heat Treatment Step b)

In accordance with the invention, said preparation process comprises a step b) for heat treatment of the suspension obtained from the precipitation step a), said heat treatment step being operated at a temperature in the range 60° C. to 200° C. for a period in the range 30 minutes to 5 hours, in order to obtain the alumina gel.

Preferably, said heat treatment step b) is a maturation step.

Preferably, said heat treatment step b) is operated at a temperature in the range 65° C. to 150° C., preferably in the range 65° C. to 130° C., more preferably in the range 70° C. to 110° C., highly preferably in the range 70° C. to 95° C.

Preferably, said heat treatment step b) is carried out for a period in the range 40 minutes to 5 hours, preferably in the range 40 minutes to 3 hours and more preferably in the range 45 minutes to 2 hours.

Optional Second Precipitation Step

In accordance with a preferred embodiment, in the case in which the percentage completion obtained at the end of precipitation step a) is below 100%, said preparation process preferably comprises a second precipitation step a') after the first precipitation step. Said second precipitation step can be used to increase the proportion of alumina produced. Said second precipitation step a') is advantageously carried out between said first precipitation step a) and the heat treatment step b).

In the case in which a second precipitation step is carried out, a step for heating the suspension obtained at the end of the precipitation step a) is advantageously carried out between the two precipitation steps a) and a').

Preferably, said step for heating the suspension obtained from step a), carried out between said step a) and the second precipitation step a'), is operated at a temperature in the range 20° C. to 90° C., preferably in the range 30° C. to 80° C., more preferably in the range 30° C. to 70° C. and highly preferably in the range 40° C. to 65° C.

Preferably, said heating step is carried out for a period in the range 7 to 45 minutes, preferably in the range 7 to 35 minutes.

Said heating step is advantageously carried out using any of the heating methods known to the skilled person.

In accordance with said preferred embodiment, said preparation process comprises a second step for precipitation of the suspension obtained at the end of the heating step, said second step being operated by adding to said suspension at least one basic precursor selected from sodium aluminate, potassium aluminate, ammonia, sodium hydroxide and potassium hydroxide and of at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected in a manner such as to obtain a pH of the reaction medium in the range 8.5 to 10.5 and the flow rate of the acidic and basic precursor or precursors containing aluminium being regulated in a manner such as to obtain a percentage completion of the second step in the range 0 to 60%, the percentage completion being defined as being the proportion of alumina formed in equivalents of $Al_2O_3$ during said second precipitation step with respect to the total quantity of alumina formed at the end of the two precipitation steps, more generally at the end of the steps for the preparation of the alumina gel and preferably at the end of step a') of the preparation process of the invention, said step being operated at a temperature in the range 40° C. to 90° C., and for a period in the range 2 minutes to 50 minutes.

As was the case for the first precipitation step a), adding at least one basic precursor and at least one acidic precursor to the heated suspension necessitates that either at least the basic precursor or the acidic precursor comprises aluminium, or that the two precursors, basic and acidic, comprise aluminium.

The basic precursors comprising aluminium are sodium aluminate and potassium aluminate. The preferred basic precursor is sodium aluminate.

The acidic precursors comprising aluminium are aluminium sulphate, aluminium chloride and aluminium nitrate. The preferred acidic precursor is aluminium sulphate.

Preferably, the basic and acidic precursor(s) is/are added to said second precipitation step a') as aqueous solutions.

Preferably, said second precipitation step is operated with stirring.

Preferably, said second step is carried out in the absence of an organic additive.

The acidic and basic precursors, whether or not they contain aluminium, are mixed, preferably in solution, into the aqueous reaction medium in proportions such that the pH of the resulting suspension is in the range 8.5 to 10.5.

As was the case for the precipitation step a), it is the relative flow rate of the acidic and basic precursors, whether or not they contain aluminium, which is selected so as to obtain a pH of the reaction medium in the range 8.5 to 10.5.

In the preferred case in which the basic and acidic precursors are respectively sodium aluminate and aluminium sulphate, the weight ratio of said basic precursor to said acidic precursor is advantageously in the range 1.6 to 2.05.

For the other basic and acidic precursors, whether or not they contain aluminium, the base/acid weight ratios are established by a plot for the neutralization of the base by the acid. A plot of this type can readily be obtained by the skilled person.

Preferably, said second precipitation step is carried out at a pH in the range 8.5 to 10, preferably in the range 8.7 to 9.9.

The acidic and basic precursors are also mixed in quantities which can be used to obtain a suspension containing the desired quantity of alumina, as a function of the final concentration of alumina to be obtained. In particular, said second precipitation step can be used to obtain 0 to 60% by weight of alumina in equivalents of $Al_2O_3$ with respect to the total quantity of alumina formed at the end of the two precipitation steps.

As was the case for the precipitation step a), it is the flow rate of the acidic and basic precursors containing aluminium which is regulated in a manner such as to obtain a percentage completion of the second step in the range 0 to 60%.

Preferably, the percentage completion of said precipitation step a) is in the range 10% to 55%, preferably in the range 15% to 55%.

Thus, depending on the intended concentration of the alumina at the end of the precipitation step or steps, preferably in the range 20 to 100 g/L, the quantities of aluminium which have to be supplied by the acidic and/or basic precursors are calculated and the flow rate of the precursors is regulated as a function of the concentration of said precursors of aluminium which are added, the quantity of water added to the reaction medium and the percentage completion required for each of the precipitation steps.

As was the case for the precipitation step a), the flow rates of the acidic and/or basic precursors containing aluminium depend on the dimensions of the reactor used and thus on the quantity of water added to the reaction medium.

By way of example, if a 3 L reactor is used and 1 L of alumina suspension with a final $Al_2O_3$ concentration of 50 g/L is required, the target percentage completion is 50% as the equivalent of $Al_2O_3$ for the first precipitation step. Thus, 50% of the total alumina has to be supplied during the precipitation step a). The alumina precursors are sodium aluminate in a concentration of 155 g/L of $Al_2O_3$ and aluminium sulphate in a concentration of 102 g/L of $Al_2O_3$. The pH for precipitation of the first step is fixed at 9.5 and the second at 9. The quantity of water added to the reactor is 622 mL.

For the first precipitation step a) operating at 30° C. and for 8 minutes, the aluminium sulphate flow rate has to be 10.5 mL/min and the sodium aluminate flow rate is 13.2 mL/min. The weight ratio of sodium aluminate to aluminium sulphate is thus 1.91. For the second precipitation step, operated at 70° C. for 30 minutes, the aluminium sulphate flow rate has to be 2.9 mL/min and the sodium aluminate flow rate is 3.5 mL/min. The weight ratio of sodium aluminate to aluminium sulphate is thus 1.84.

Preferably, the second precipitation step is carried out at a temperature in the range 40° C. to 80° C., preferably in the range 45° C. to 70° C. and highly preferably in the range 50° C. to 70° C.

Preferably, the second precipitation step is carried out for a period in the range 5 to 45 minutes, preferably 7 to 40 minutes.

The second precipitation step can also be used in general to obtain a suspension of alumina with a concentration, in the form of $Al_2O_3$, in the range 20 to 100 g/L, preferably in the range 20 to 80 g/L, more preferably in the range 20 to 50 g/L.

In the case in which said second precipitation step is carried out, said preparation process also advantageously comprises a second step for heating the suspension obtained at the end of said second precipitation step to a temperature in the range 50° C. to 95° C., preferably in the range 60° C. to 90° C.

Preferably, said second heating step is carried out for a period in the range 7 to 45 minutes.

Said second heating step is advantageously carried out using any of the heating methods known to the skilled person.

Said second heating step can be used to increase the temperature of the reaction medium before the suspension obtained undergoes the heat treatment step b).

Filtration Step c)

In accordance with the invention, the process for the preparation of alumina of the invention also comprises a step c) for filtration of the suspension obtained at the end of heat treatment step b), followed by at least one step for washing the gel obtained. Said filtration step is carried out using methods which are known to the skilled person.

The filterability of the suspension obtained at the end of the precipitation step a) or of the two precipitation steps is improved by the presence of said step b) for final heat treatment of the suspension obtained, said heat treatment step favouring the productivity of the preparation process as well as an extrapolation of the process on an industrial scale.

Said filtration step is advantageously followed by at least one water washing step, preferably by one to three washing steps using a quantity of water equal to the quantity of filtered precipitate.

The concatenation of steps a), b) and c) and optionally of the second precipitation step, of the second heating step and of the optional filtration step, can be used to obtain a specific alumina gel with a dispersibility index of more than 70%, a crystallite size in the range 1 to 35 nm, as well as a sulphur content in the range 0.001% to 2% by weight and a sodium content in the range 0.001% to 2% by weight, the percentages by weight being expressed with respect to the total mass of alumina gel.

The alumina gel obtained thereby, also known as boehmite, has a dispersibility index in the range 70% to 100%, preferably in the range 80% to 100%, highly preferably in the range 85% to 100% and still more preferably in the range 90% to 100%.

Preferably, the alumina gel obtained has a crystallite size in the range 2 to 35 nm.

Preferably, the alumina gel obtained comprises a sulphur content in the range 0.001% to 1% by weight, preferably in the range 0.001% to 0.40% by weight, highly preferably in the range 0.003% to 0.33% by weight, and even more preferably in the range 0.005% to 0.25% by weight.

Preferably, the alumina gel obtained thereby comprises a sodium content in the range 0.001% to 1% by weight, preferably in the range 0.001% to 0.15% by weight, highly preferably in the range 0.0015% to 0.10% by weight, and 0.002% to 0.040% by weight.

In particular, the alumina gel or boehmite in the form of a powder in accordance with the invention is composed of crystallites the sizes of which, obtained by the Scherrer X ray diffraction formula along the crystallographic directions [020] and [120], are respectively in the range 2 to 20 nm and in the range 2 to 35 nm.

Preferably, the alumina gel of the invention has a crystallite size in the [020] crystallographic direction in the range 2 to 15 nm and a crystallite size in the [120] crystallographic direction in the range 2 to 35 nm.

X ray diffraction of the alumina gels or boehmites was carried out employing the conventional powder method with the aid of a diffractometer.

Scherrer's formula is a formula used in the X ray diffraction of polycrystalline samples that links the width at half maximum of the diffraction peaks to crystallite size. It is described in detail in the reference: Appl. Cryst. (1978). 11, 102-113, Scherrer after sixty years: A survey and some new results in the determination of crystallite size, J. I. Langford and A. J. C. Wilson.

The alumina gel prepared in this manner and with a high degree of dispersibility means that the step for shaping said gel by the drop coagulation technique known as oil drop is facilitated.

Drying Step d)

In accordance with the invention, the alumina gel obtained at the end of the filtration step c) is dried in a drying step d) in order to obtain a powder.

Said drying step is advantageously carried out at a temperature in the range 20° C. to 50° C. and for a period in the range 1 day to 3 weeks or by spray drying.

In the case in which said drying step d) is carried out at a temperature in the range 20° C. to 50° C. and for a period in the range 1 day to 3 weeks, said drying step d) may advantageously be carried out in a closed and ventilated oven; preferably, said drying step is operated at a temperature in the range 25° C. to 40° C., and for a period in the range 3 days to two weeks.

In the case in which said drying step d) is carried out by spray drying, the cake obtained at the end of the heat treatment step, optionally followed by a step for filtering, is taken up into suspension. Said suspension is then sprayed in fine droplets into a vertical cylindrical chamber in contact with a stream of hot air in order to evaporate the water in accordance with a principle which is well known to the skilled person. The powder obtained is entrained by the flow of heat to a cyclone or a sleeve filter which will separate the air from the powder. Preferably, in the case in which said drying step d) is carried out by spray drying, spray drying may be carried out in accordance with the operating protocol described in the publication Asep Bayu Dani Nandiyanto, Kikuo Okuyama, Advanced Powder Technology, 22, 1-19, 2011.

Shaping Step e)

In accordance with the invention, the powder obtained at the end of the drying step d) is shaped in a step e) by drop coagulation in order to obtain a green material.

The term "green material" means the shaped material which has not undergone heat treatment steps.

Said drop coagulation shaping step e), also known as droplet coagulation or the oil drop method, is carried out using any other method which is well known to the skilled person.

In particular, said drop coagulation shaping step comprises preparing a suspension comprising the dried powder, a pore-forming agent, a surfactant and water, with stirring.

The quantity of pore-forming agent, expressed as the ratio of the mass of pore-forming agent to the total mass of alumina, expressed as a percentage of $Al_2O_3$ engaged in the suspension, is in the range 0.2% to 60%, preferably in the range 0.5% to 50%, more preferably in the range 5% to 50%. The pore-forming agent is a product which is not completely miscible with water, which can be eliminated by combustion and is liquid at ambient temperature. It may be selected from greases, oils and mineral waxes, fats, hydrocarbons and oil cuts. As an example, the pore-forming agent is a paraffinic cut containing 10 to 14 carbon atoms, formed by normal and iso-paraffins, and having a boiling point in the range 220° C. to 350° C.

The surfactants which are particularly suitable are non-ionic surfactants or ionic surfactants, for example cationic surfactants, used alone or as a mixture. Preferably, non-ionic surfactants are used. The proportion of surfactant present in the emulsion is defined as being equal to the ratio of the mass of surfactant to the mass of pore-forming agent. This ratio is in the range 1% to 25% by weight, preferably in the range 1% to 15% and more preferably in the range 3% to 10%.

The quantity of water in the emulsion represents 5% to 20% by weight of the total quantity of water corresponding to the mixture (dried powder suspension).

The emulsion is advantageously prepared at a temperature in the range 15° C. to 60° C., preferably in the range 20° C. to 40° C.

When preparing the suspension of boehmite, it is possible to add a charge of alumina or an alumina precursor. The quantity of charge employed, expressed as the % by weight of $Al_2O_3$, is less than or equal to 30% by weight with respect to the total equivalent weight of $Al_2O_3$ of the suspension.

Optionally, the suspension may comprise a salt of one or more elements selected from groups IIIA, IVA, VA and the lanthanides which act as a promoter. These elements will thus be incorporated into the final spheroidal particles after drying and calcining. The proportion of the metallic salt or salts is calculated such that the content by weight of the elements from groups IA, IIA, IIIA, IVA, VA or lanthanides in the final product after calcining is in the range 0.01% to 2% by weight, preferably in the range 0.05% to 1% by weight.

The quantity of acid engaged in the suspension is such that the ratio of the mass of said acid with respect to the dry mass of the dried powder and the charge (if present in the suspension) is in the range 0.5% to 20%, preferably in the range 1% to 15%. By way of example, the aqueous acidic solution is a solution of a strong mineral acid such as $HNO_3$ or $H_2SO_4$.

The proportion of water engaged in the suspension is calculated such that the dry matter ratio (corresponding to the mass of boehmite powder plus any charge, expressed as equivalents of $Al_2O_3$) to the total mass of water of the suspension is in the range 10% to 50%, preferably in the range 15% to 40%.

After mixing the suspension, stirring of the solution obtained is maintained until the viscosity of said solution is in the range 200 to 700 MPa·s, preferably in the range 250 to 400 MPa·s. Thus, the solution has rheological properties which are suitable for being dropped through the nozzles of the oil coagulation head.

One method which is particularly suitable for shaping is drop coagulation. This method consists of passing the alumina suspension through an oil coagulation head constituted by nozzles with an orifice of a set size in order to form droplets. The oil coagulation head is placed at the top of a column containing an upper organic phase and a lower phase constituted by a basic aqueous phase. The organic phase is selected in a manner such that it has a density slightly lower than that of water.

As the droplet passes through the organic phase, spheres are formed, while gelling (or coagulation) occurs in the aqueous phase.

Surfactants or phase transfer agent type additives may be added to the aqueous phase in order to encourage the passage through the interface and coagulation of the particles in the basic aqueous phase.

The non-miscible organic phase may advantageously be selected from greases, oils and mineral waxes, fats, hydrocarbons and oil cuts. Preferably, the organic phase is a paraffinic cut containing 10 to 14 carbon atoms formed by normal and iso-paraffins and having a boiling point in the range 220° C. to 350° C.

The basic aqueous phase is, for example, an ammoniacal, ammonium carbonate or amine solution. Preferably, the aqueous basic phase is an ammoniacal solution.

At the end of the step for the formation of spheroidal particles, the beads are recovered and separated from the aqueous phase on a screen. It is also possible for the particles formed hereby to undergo one or more maturation steps as disclosed in application EP 001 103.

Heat Treatment Step f)

In accordance with the invention, the green material obtained at the end of shaping step e) then undergoes a heat treatment step f) at a temperature in the range 500° C. to 1000° C., for a period in the range 2 to 10 h, in the presence or otherwise of a stream of air containing up to 60% by volume of water.

Preferably, said heat treatment step f) is operated at a temperature in the range 540° C. to 850° C.

Preferably, said heat treatment step f) is operated for a period in the range 2 h to 10 h.

Said heat treatment step f) can be used to allow the transition of the boehmite into the final alumina.

The process for the preparation of alumina in accordance with the invention can be used to obtain beads of amorphous mesoporous alumina with a controlled mesoporosity, said alumina having good thermal and chemical stability, with a centred, uniform and controlled mesopore size distribution and in particular a high specific surface area compared with alumina beads obtained using conventional prior art processes.

Another aim of the present invention concerns the alumina beads which are capable of being obtained by the preparation process of the invention.

Said alumina beads advantageously have a sulphur content in the range 0.001% to 1% by weight, preferably in the range 0.001% to 0.40% by weight, highly preferably in the range 0.003% to 0.33% by weight, and more preferably in the range 0.005% to 0.25% by weight with respect to the total mass of said alumina beads.

Said alumina beads also advantageously have a sodium content which is advantageously in the range 0.001% to 1% by weight, preferably in the range 0.001% to 0.15% by weight, highly preferably in the range 0.0015% to 0.10% by weight, and 0.002% to 0.040% by weight with respect to the total mass of said alumina beads.

The process of the invention can be used to form spheroidal particles or beads generally having a mean diameter in the range 1.2 to 3 mm, and a mean grain crushing strength (GCS) of at least 2.5 daN, preferably at least 3.0 daN.

Preferably, the alumina beads obtained in accordance with the present invention advantageously have a specific surface area of more than 180 m$^2$/g, preferably more than 220 m$^2$/g.

The alumina beads obtained in accordance with the present invention also advantageously have a specific pore distribution.

Preferably, the alumina beads obtained are mesoporous and free of micropores.

The median diameter of the mesopores (Dp in nm), measured by mercury porosimetry, of said alumina beads obtained, determined by volume, is advantageously in the range 7 to 12.5 nm.

Preferably, the total pore volume of said alumina beads obtained thereby, measured using mercury porosimetry, is in the range 0.5 to 0.85 mL/g.

Preferably, the volume of the mesopores of said alumina beads obtained thereby, measured by mercury porosimetry, is in the range 0.5 to 0.8 mL/g, preferably in the range 0.55 to 0.75 mL/g and highly preferably in the range 0.60 to 0.75 mL/g.

Preferably, the volume of the macropores of said alumina beads obtained thereby, measured by mercury porosimetry, is in the range 0 to 0.04 mL/g, preferably in the range 0 to 0.02 mL/g.

Preferably, said alumina beads obtained are not mesostructured.

In another aspect, the invention concerns alumina beads having a sulphur content in the range 0.001% to 1% by weight, and a sodium content in the range 0.001% to 1% by weight with respect to the total mass of said beads, which are capable of being obtained by the preparation process of the invention.

Said alumina beads obtained thereby have a specific surface area and a pore distribution which are calibrated and suitable for their use as catalyst supports in refining processes operated in ebullated bed mode, and in particular in the catalytic reforming processes of the invention.

In another aspect, the invention concerns the use, in a process for the catalytic reforming of a hydrocarbon feed comprising n-paraffinic, naphthenic and aromatic hydrocarbons, of a catalyst comprising at least one or more metals selected from group VIII of the periodic classification, and a support comprising amorphous mesoporous alumina beads prepared using the preparation process of the invention, said process being operated at a temperature in the range 400° C. to 700° C., a pressure in the range 0.1 to 4 MPa and a mass flow rate of feed treated per unit mass of catalyst per hour in the range 0.1 to 10 h$^{-1}$.

The metals from group VIII are advantageously selected from platinum, palladium, ruthenium and rhodium; preferably, the metal from group VIII is platinum.

The quantity of metals from group VIII is preferably in the range 0.02% to 2% by weight, preferably in the range 0.05% to 1.5% by weight, still more preferably in the range 0.1% to 0.8% by weight.

The catalyst used in the catalytic reforming process of the invention may also optionally include at least one promoter selected from groups IIIA, IVA, VA of the periodic table. These promoter elements are present in the catalyst after calcining in a content which is generally in the range 0.01% to 2% by weight of catalyst.

The catalyst used in the catalytic reforming process of the invention may also optionally and preferably comprise a halogenated compound wherein the halogen is selected from the group constituted by fluorine, chlorine, bromine and iodine. The quantity of halogenated compound wherein the halogen is generally in the range 0.1% to 8% by weight, preferably in the range 0.2% to 5% by weight of catalyst after calcining.

Preferably, a single halogen is used, in particular chlorine. When the catalyst comprises a single halogen which is chlorine, the quantity of chlorine is in the range 0.5% to 2% by weight with respect to the total weight of catalyst.

By way of example, a catalyst which can be used as a catalyst for reforming an oil cut may comprise platinum, tin (optionally other metals) and chlorine deposited on a support comprising alumina beads obtained using the process of the present invention.

The reforming processes can be used to increase the octane number of the gasoline fractions originating from the distillation of crude oil and/or from other refining processes. Processes for the production of aromatics provide bases (benzene, toluene and xylene) which can be used in petrochemistry. These processes are of additional importance in that they contribute to the production of large quantities of hydrogen, which is indispensable to refinery hydrotreatment processes. These two types of process are distinguished by the choice of operating conditions and possibly by the composition of the feed.

The hydrocarbon feed for the catalytic reforming process of the invention contains paraffinic, naphthenic and aromatic hydrocarbons containing 6 to 12 carbon atoms per molecule. This feed is defined, inter alia, by its density and its composition by weight.

The invention will now be illustrated by the following examples which are not in any way limiting in nature.

EXAMPLES

Example 1 (Comparative): Preparation of a Support AL-1 (not in Accordance) by Drop Coagulation Firstly, an alumina gel which was not in accordance with the invention was synthesized, Example 1 employed a preparation process which did not include a step for heat treatment of the suspension obtained after the precipitation steps and because the first precipitation step a) did not produce a quantity of alumina of more than 40% as equivalents of $Al_2O_3$ compared with the total quantity of alumina formed at the end of the second precipitation step.

The synthesis was carried out in a 7 L reactor, producing a final 5 L of suspension in 2 precipitation steps. The quantity of water added to the reactor was 3868 mL.

The final target concentration of alumina was 30 g/L.

A first step for co-precipitation of aluminium sulphate $Al_2(SO_4)$ and sodium aluminate NaAlOO was carried out at 30° C. and at a pH of 9.3 for a period of 8 minutes. The concentrations of the aluminium precursors used were as follows: $Al_2(SO_4)$=102 g/L as $Al_2O_3$ and NaAlOO=155 g/L as $Al_2O_3$. Stirring was at 350 rpm throughout the synthesis.

A solution of aluminium sulphate $Al_2(SO_4)$ was continuously added for 8 minutes at a flow rate of 19.6 mL/min to a solution of sodium aluminate NaAlOO in a base/acid weight ratio of 1.80 in order to adjust the pH to a value of 9.3. The temperature of the reaction medium was maintained at 30° C.

A suspension containing an alumina precipitate was obtained.

The final target concentration of alumina was 30 g/L, and so the flow rate of the aluminium sulphate $Al_2(SO_4)$ and sodium aluminate NaAlOO precursors containing aluminium introduced into the first precipitation step were respectively 19.6 mL/min and 23.3 mL/min.

These flow rates of the acidic and basic precursors containing aluminium allowed a percentage completion of 30% to be obtained at the end of the first precipitation step.

The temperature of the suspension obtained was then raised from 30° C. to 57° C.

A second step for co-precipitation of the suspension obtained was then carried out by adding aluminium sulphate $Al_2(SO_4)$ at a concentration of 102 g/L as $Al_2O_3$ and sodium aluminate NaAlOO at a concentration of 155 g/L as $Al_2O_3$. A solution of aluminium sulphate $Al_2(SO_4)$ was thus added continuously to the heated suspension obtained at the end of the first precipitation step over 30 minutes at a flow rate of 12.8 mL/min, and a solution of sodium aluminate NaAlOO in a base/acid weight ratio of 1.68 in order to adjust the pH to a value of 8.7. The temperature of the reaction medium in the second step was maintained at 57° C.

A suspension containing an alumina precipitate was obtained.

The target final concentration of alumina was 30 g/L, and so the flow rate of the aluminium sulphate $Al_2(SO_4)$ and sodium aluminate NaAlOO precursors containing aluminium introduced in the second precipitation step were respectively 12.8 mL/min and 14.1 mL/min. These flow rates of the acidic and basic precursors containing aluminium were used in order to obtain a percentage completion of 70% at the end of the second precipitation step.

The suspension obtained did not undergo a heat treatment step.

The suspension obtained was then filtered by displacing water on a Buchner frit type apparatus and the alumina gel obtained was washed 3 times with 5 L of distilled water at 70° C. The time for filtration and for the washes was 4 h.

The characteristics of the alumina gel obtained thereby are summarized in Table 1.

TABLE 1

Characteristics of alumina gel obtained in accordance with Example 1.

| | |
|---|---|
| Dispersibility index Ta = 10% (%) | 60 |
| Size, [020] (nm) | 2.9 |
| Size, [120] (nm) | 4.1 |
| Sodium Na (ppm) | 0.011 |
| Sulphur S (ppm) | 0.057 |
| Filtration time | 4 h |

The alumina gel was then dried by spray dried, using an inlet temperature of 250° C. and an outlet temperature of 130° C.

A suspension containing 25% of mineral material (expressed as the % $Al_2O_3$) was prepared by mixing a γ alumina charge having a median volume diameter D50 of 50 μm and the dried alumina gel in an acidified aqueous solution containing 4% by weight of $HNO_3/Al_2O_3$.

The solid $Al_2O_3$ fraction was brought up to 88% by weight with the dried alumina gel and to 14% with the γ alumina charge. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm³. The surfactant was Galoryl. These compounds were introduced in the following proportions: fraction by weight of pore-forming agent/alumina expressed as % $Al_2O_3$=14% and fraction by weight of surfactant/pore-forming agent=6%.

The system was stirred at 600 rpm until a suspension was obtained with rheological properties suitable for drop coagulation (viscosity 250 MPa·s). With this acid content and the alumina gel prepared in this manner, peptisation of the boehmite was insufficient and the viscosity of the suspension did not increase.

Shaping a low dispersibility gel (dispersibility index=60%) prepared in this manner by drop coagulation was thus impossible.

Example 2: Pural SB3, not in Accordance with the Invention

The alumina beads were prepared using a Pural SB3 type boehmite sold by Sasol the X ray diffraction diagram of which presented a ratio of crystallite sizes in the [020] and [120] directions obtained using the Scherrer formula, of 0.66.

A suspension containing 20% of mineral material (expressed as the % $Al_2O_3$) was prepared by mixing a γ alumina charge with a median volume diameter D50 of 50 μm and Pural SB3 boehmite powder in an acidified aqueous solution containing 3.6% by weight of $HNO_3/Al_2O_3$.

The solid $Al_2O_3$ fraction was brought up to 88% by weight by the boehmite and to 14% by the γ alumina charge. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm³. The surfactant was Galoryl, a commercial emulsifying agent. These compounds were introduced in the following proportions: fraction by weight of pore-forming agent/alumina expressed as the % $Al_2O_3$=14% and fraction by weight of surfactant/pore-forming agent=6%. The system was stirred at 600 rpm until a suspension with rheological properties suitable for drop coagulation was obtained (viscosity 250 MPa·s).

The drop coagulation column was charged with an ammoniacal solution in a concentration of 28 g/L and an organic solution constituted by the same oil cut as that used as the pore-forming agent in the preparation of the emulsion (organic phase in the upper layer). The suspension was drop coagulated using calibrated nozzles. The beads were recovered from the bottom of the column and placed in a ventilated oven at 120° C. in moist air containing 200 g water/kg of dry air for 12 h. They were then calcined in dry air at 650° C. for 3 hours. The beads obtained had a sphericity, determined by the diameter measured by the grain crushing strength test and by imagery, of 0.88. the beads obtained had a mean diameter, determined by the grain crushing strength test, of 1.9 mm.

TABLE 2

Characteristics of alumina beads obtained in accordance with Example 2.

| | Pural SB3 |
| --- | --- |
| $S_{BET}$ (m²/g) | 200 |
| TPV (Hg) (mL/g) | 0.68 |
| Vmacro (50-7000 nm) (Hg) (mL/g) | 0.01 |
| Vmeso (Hg) (mL/g) | 0.65 |
| Sodium Na (ppm) | 0 |
| Sulphur S (ppm) | 0 |

Example 3 (in Accordance with the Invention): Preparation of AL-3 and AL-4 Supports (in Accordance with the Invention)

Firstly, two alumina supports AL-3 and AL-4 were synthesised using a preparation process in accordance with the invention in a 7 L reactor to produce 5 L of a final suspension in 3 steps, two precipitation steps followed by a maturation step.

The target final concentration of alumina was 45 g/L. The quantity of water added to the reactor was 3267 mL. Stirring was at 350 rpm throughout the synthesis.

A first step for co-precipitation in water of aluminium sulphate $Al_2(SO_4)$ and sodium aluminate NaAlOO was carried out at 30° C. and at a pH of 9.5 for a period of 8 minutes. The concentrations of the aluminium precursors used were as follows: $Al_2(SO_4)$=102 g/L as $Al_2O_3$ and NaAlOO=155 g/L as $Al_2O_3$.

A solution of aluminium sulphate $Al_2(SO_4)$ was continuously added over 8 minutes at a flow rate of 69.6 mL/min to a solution of sodium aluminate NaAlOO at a flow rate of 84.5 mL/min in a base/acid weight ratio of 1.84 in order to adjust the pH to a value of 9.5. The temperature of the reaction medium was kept at 30° C.

A suspension containing an alumina precipitate was obtained.

The target final concentration of alumina was 45 g/L, and so the flow rate of the aluminium sulphate $Al_2(SO_4)$ and sodium aluminate NaAlOO precursors containing aluminium introduced into the first precipitation step were respectively 69.6 mL/min and 84.5 mL/min. These flow rates of the acidic and basic precursors containing aluminium meant that a percentage completion of 72% could be obtained at the end of the first precipitation step.

The temperature of the suspension obtained was then raised from 30° C. to 68° C.

A second step for co-precipitation of the suspension obtained was then carried out by adding aluminium sulphate $Al_2(SO_4)$ in a concentration of 102 g/L as $Al_2O_3$ and sodium aluminate NaAlOO in a concentration of 155 g/L as $Al_2O_3$. A solution of aluminium sulphate $Al_2(SO_4)$ was thus continuously added to the heated suspension obtained at the end of the first precipitation step over 30 minutes at a flow rate of 7.2 mL/min and a solution of sodium aluminate NaAlOO in a base/acid weight ratio of 1.86 in order to adjust the pH to a value of 9. The temperature of the reaction medium in the second step was maintained at 68° C.

A suspension containing a precipitate of alumina was obtained.

The target final concentration of alumina was 45 g/L, the flow rates of the aluminium sulphate $Al_2(SO_4)$ and sodium aluminate NaAlOO precursors containing aluminium introduced into the second precipitation step were respectively 7.2 mL/min and 8.8 mL/min.

These flow rates of the acidic and basic precursors containing aluminium meant that a percentage completion of 28% could be obtained at the end of the second precipitation step.

The temperature of the suspension obtained was then raised from 68° C. to 90° C.

The suspension then underwent a heat treatment step in which it was maintained at 90° C. for 60 minutes.

The suspension obtained was then filtered by displacement of water on a Buchner frit type apparatus and the alumina gel obtained was washed 3 times with 5 L of distilled water. The time for the filtration and the washes was 3 h.

The characteristics of the alumina gel obtained are summarized in Table 3.

TABLE 3

Characteristics of alumina gel obtained in accordance with Example 3.

| Dispersibility index Ta = 10% (%) | 100 |
| --- | --- |
| Size, [020] (nm) | 2.8 |
| Size, [120] (nm) | 3.5 |
| Sodium Na (%) | 0.074 |
| Sulphur S (%) | 0.850 |
| Filtration time | 3 h |

A gel with a dispersibility index of 100% was thus obtained.

The alumina gel obtained was then dried by spray drying with an inlet temperature of 250° C. and an outlet temperature of 130° C. The spray dried gel was termed gel No. 1.

The alumina gel obtained in accordance with Example 2 was also dried in a ventilated oven at 35° C. for 4 days. The oven dried gel was termed gel No. 2.

Two suspensions containing 25% of mineral material (expressed as the % of $Al_2O_3$) were prepared by mixing a γ alumina charge with a median diameter by volume D50 of 50 μm and respectively alumina gels 1 and 2 obtained in an acidified aqueous solution containing 4% by weight of $HNO_3/Al_2O_3$.

The solid $Al_2O_3$ fraction was brought up to 88% by weight by the alumina gels 1 and 2 respectively and to 14% by the γ alumina charge. This suspension also contained a pore-forming agent and a surfactant. The pore-forming agent was an organic phase comprising a mixture of paraffins containing 10 to 12 carbon atoms with a boiling point of approximately 290° C. and a density of 0.75 g/cm³. The surfactant was Galoryl. These compounds were introduced in the following proportions: fraction by weight of pore-forming agent/alumina expressed as the % $Al_2O_3$=14% and fraction by weight of surfactant/pore-forming agent=6%. The system was stirred at 600 rpm until a suspension with rheological properties suitable for drop coagulation was obtained (viscosity 250 MPa·s).

Shaping by drop coagulation was carried out. The drop coagulation column was charged with an ammoniacal solution in a concentration of 28 g/L and an organic solution constituted by the same oil cut as that used as the pore-forming agent in the preparation of the emulsion (organic phase in upper layer). The suspension was oil coagulated using calibrated nozzles. The beads were recovered from the column bottom and placed in a ventilated oven at 120° C. in moist air containing 200 g of water/kg of dry air for 12 h. They were then calcined in dry air at 600° C. for 3 hours.

The beads obtained had a sphericity, determined by the diameter measured in the grain crushing strength test and by imagery, of 0.92.

They had a mean diameter, determined by the grain crushing strength test, of 1.80 mm.

The characteristics of the alumina beads AL-3 and AL-4 formed are reported in Table 4:

TABLE 4

Characteristics of AL-3 and AL-4 alumina beads obtained in accordance with Example 3.

|  | AL-3 | AL-4 |
|---|---|---|
| Type of drying | Spray drying | 35° C. |
| $S_{BET}$ (m²/g) | 280 | 281 |
| TPV (Hg) (mL/g) | 0.61 | 0.60 |
| Vmacro (Hg) (mL/g) | 0.01 | 0.01 |
| Vmeso (Hg) (mL/g) | 0.60 | 0.59 |
| Dp at Vmeso/2 (nm) (Hg) | 7.2 | 7.1 |
| Sodium Na (%) | 0.074 | 0.075 |
| Sulphur S (%) | 0.850 | 0.84 |

Thus, the preparation process of the invention can be used to shape a highly dispersible alumina gel by drop coagulation, the process meaning that alumina beads can be obtained with a very high specific surface area compared with alumina beads obtained with prior art processes, in particular with respect to alumina beads obtained from Pural SB3 (Example 2).

The invention claimed is:

1. A process for the preparation of an alumina in the form of beads with a sulphur content in the range 0.001% to 1% by weight and a sodium content in the range 0.001% to 1% by weight with respect to the total mass of said beads, said process comprising at least the following:
   a) at least one precipitation of alumina, in an aqueous reaction medium, using at least one basic precursor that is sodium aluminate, potassium aluminate, ammonia, sodium hydroxide or potassium hydroxide and at least one acidic precursor that is aluminium sulphate, aluminium chloride, aluminium nitrate, sulphuric acid, hydrochloric acid or nitric acid, in which at least one of the basic or acidic precursors comprises aluminium, the relative flow rate of the acidic and basic precursors being selected in a manner such as to obtain a pH of the reaction medium in the range 8.5 to 10.5 and the flow rate of the acidic and basic precursor or precursors containing aluminium being regulated in a manner such as to obtain a percentage completion of said precipitation in the range 40% to 100%, the percentage completion being defined as being the proportion of alumina formed in equivalents of $Al_2O_3$ during said precipitation with respect to the total quantity of alumina formed at the end of the precipitation or precipitations, said precipitation being operated at a temperature in the range 10° C. to 50° C., and for a period in the range 2 minutes to 30 minutes;
   b) heat treatment of a suspension obtained at the end of a) at a temperature in the range 50° C. to 200° C. for a period in the range 30 minutes to 5 hours in order to obtain an alumina gel;
   c) filtration of a suspension obtained at the end of the heat treatment b) followed by at least one washing of the gel obtained;
   d) drying the alumina gel obtained at the end of c) in order to obtain a powder;
   e) shaping the powder obtained at the end of d) by drop coagulation in order to obtain a green material;
   f) heat treatment of the green material obtained at the end of e) at a temperature in the range 500° C. to 1000° C., in the presence or absence of a stream of air containing up to 60% by volume of water, in which in the case in which the percentage completion obtained at the end of a first precipitation a) is less than 100%, said preparation process comprises a second precipitation a') after the first precipitation.

2. The process according to claim 1, in which the basic precursor is sodium aluminate.

3. The process according to claim 1, in which the acidic precursor is aluminium sulphate.

4. The process according to claim 1, in which the percentage completion of said precipitation a) is in the range 45% to 90%.

5. The process according to claim 1, in which heating the suspension obtained at the end of the precipitation a) is carried out between the two precipitation a) and a'), said heating being operated at a temperature in the range 20° C. to 90° C. for a period in the range 7 to 45 minutes.

6. The process according to claim 5, in which a second a') precipitation of the suspension obtained at the end of heating is operated by adding to said suspension at least one basic precursor that is sodium aluminate, potassium aluminate, ammonia, sodium hydroxide or potassium hydroxide and of at least one acidic precursor that is aluminium sulphate, aluminium chloride, aluminium nitrate, sulphuric acid, hydrochloric acid or nitric acid, in which at least one of the basic or acidic precursors comprises aluminium, the relative flow rate of the acidic and basic precursors being selected in a manner, such as to obtain a pH of the reaction medium in the range 8.5 to 10.5 and the flow rate of the acidic and basic precursor or precursors containing aluminium being regulated in a manner such as to obtain a percentage completion of the second step in the range 0 to 60%, the percentage completion being defined as being the proportion of alumina formed in equivalents of $Al_2O_3$ equivalents during said second precipitation a') with respect to the total quantity of alumina formed at the end of step a') of the preparation process, said step being operated at a temperature in the range 40° C. to 90° C., and for a period in the range 2 minutes to 50 minutes.

7. The process according to claim 1, in which said e) shaping by drop coagulation comprises preparing a suspension comprising the dried powder, a pore-forming agent that is greases, oils and mineral waxes, fats, hydrocarbons or oil cuts, a surfactant that is non-ionic surfactants or ionic surfactants and water, with stirring.

8. The process according to claim 7, in which the quantity of pore-forming agent, expressed as the ratio of the mass of pore-forming agent to the total mass of alumina expressed as the percentage of $Al_2O_3$ engaged in the suspension, is in the range 0.2% to 60%.

9. The process according to claim 7, in which the proportion of surfactant present in the emulsion, defined as being equal to the ratio of the mass of surfactant to the mass of pore-forming agent, is in the range 1% to 25% by weight.

10. The process according to claim 7 in which, during the preparation of the suspension comprising the dried powder, a charge of alumina or of, alumina precursor is added to a quantity of charge, expressed as the % by weight of $Al_2O_3$, of less than or equal to 30% by weight with respect to the total weight of the suspension in equivalents of $Al_2O_3$.

11. Alumina beads with a sulphur content in the range 0.001% to 1% by weight, and a sodium content in the range 0.001% to 1% by weight with respect to the total mass of said beads which are obtained by a process according to claim 1.

12. Alumina beads according to claim 11, having a BET specific surface area of more than 220 $m^2/g$.

13. A process for the catalytic reforming of a hydrocarbon feed comprising n-paraffinic, naphthenic and aromatic hydrocarbons, using a catalyst comprising at least one or more metals selected from group VIII of the periodic classification and a support comprising amorphous mesoporous alumina beads prepared in accordance with the preparation process according to claim 1, said process being operated at a temperature in the range 400° C. to 700° C., a pressure in the range 0.1 to 4 MPa and a mass flow rate of feed treated per unit mass of catalyst per hour in the range 0.1 to 10 $h^{-1}$.

* * * * *